United States Patent
Pfizenmaier et al.

(10) Patent No.: US 6,359,445 B1
(45) Date of Patent: Mar. 19, 2002

(54) MICROWAVE SENSOR FOR DETERMINING POSITION FOR DISPLACEMENT OF A MOVABLE PART, SUCH AS A VALVE NEEDLE

(75) Inventors: Heinz Pfizenmaier, Leonberg; Klaus Voigtlaender, Wangen, both of (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/308,472
(22) PCT Filed: Feb. 20, 1998
(86) PCT No.: PCT/DE98/00505
§ 371 Date: May 17, 1999
§ 102(e) Date: May 17, 1999
(87) PCT Pub. No.: WO98/43048
PCT Pub. Date: Oct. 1, 1998

(30) Foreign Application Priority Data

Mar. 25, 1997 (DE) ............................................. 197 12 374

(51) Int. Cl.$^7$ ........................... G01F 17/00; G01R 27/32
(52) U.S. Cl. ........................ 324/636; 324/633; 324/635
(58) Field of Search .................................. 324/633, 635, 324/636

(56) References Cited

U.S. PATENT DOCUMENTS

| 4,689,553 A | * 8/1987 | Haddox | 324/636 |
| 5,150,060 A | * 9/1992 | Bitar | 324/635 |
| 5,325,063 A | * 6/1994 | Morgan | 324/636 |
| 5,608,332 A | * 3/1997 | Crayton et al. | 324/633 |
| 5,617,034 A | * 4/1997 | Lark et al. | 324/635 |
| 5,977,778 A | * 11/1999 | Chan et al. | 324/635 |

FOREIGN PATENT DOCUMENTS

| DE | 1 222 688 | 8/1966 |
| DE | 1 623 341 | 9/1970 |
| DE | 30 23 935 A1 | 6/1982 |
| EP | 0 427 882 B1 | 3/1995 |
| EP | 0 685 930 | 12/1995 |

OTHER PUBLICATIONS

H.–G. Unger: "Elektromagnetische Theorie Fuer Die Hochfrequenztechnik", Part I, Second Edition, Huetig Verlag, pp.207–215, 292–294. (Date Unavailable).

Taschenbuch Der Hochfrequenztechnik, H. Meinke and F. W. Gundlach, Springer–Verlag, Berlin,Heidelberg, New York 1968.

* cited by examiner

Primary Examiner—Glenn W. Brown
(74) Attorney, Agent, or Firm—Michael J. Striker

(57) ABSTRACT

The microwave sensor produces an electrical output signal according to a position or displacement of a movable mechanical part (2), especially a valve needle in an injector valve for injecting fuel into an internal combustion engine. This position or displacement sensor includes a cavity resonator (40,70) provided with walls bounding a cavity (4,7) dimensioned for microwaves of a predetermined frequency and an antenna (8,14) for reception of the microwaves in the cavity. The end (3) of the movable mechanical part (2) protrudes into the cavity. A hybrid evaluating circuit (9) is connected with the antenna, which detects changes in the microwave radiation fed into and coupled out of the cavity, e.g. phase relationships, which depend on the position of the mechanical part (2), so that small position changes in very tight spaces are accurately determined.

12 Claims, 3 Drawing Sheets

MICROWAVE SENSOR FOR DETERMINING POSITION FOR DISPLACEMENT OF A MOVABLE PART, SUCH AS A VALVE NEEDLE

BACKGROUND OF THE INVENTION

1. Field of the Invention

The present invention relates to a sensor for determining position or displacement of a movable mechanical part, especially for detecting reciprocating motion of a mechanical part, such as needle valve, and, more particularly to a microwave sensor for determining position or displacement of a movable mechanical part including a cavity resonator for input microwaves of a predetermined frequency, which comprises at least partly metal walls bounding a cavity into which the mechanical part extends, and an antenna for receiving the microwaves fed into the cavity.

2. Prior Art

Sensors of this type are used particularly in measuring relatively short displacements or strokes of deflectable bodies, such as in detecting the valve needle stroke in injection valves for motor vehicles. In order to detect the slightest deflection motions within the tightest possible space known optical or magnetic sensors are constructed, which as a rule are structurally very complicated and entail high cost.

From European Patent Disclosure EP 0 427 882 B1, for instance, a sensor of the above-defined type is known in which a permanent magnet, as a deflectable body, moves in the range of a magnetic-field-sensitive sensor.

Particularly for measuring needle strokes in an injection nozzle system for motor vehicles with improved emissions values, the stroke sensor should be disposed directly in the nozzle holder, where the installation space is extremely tight.

It should be possible to detect the needle stroke even at an initial stroke of approximately 20 $\mu$m; the ambient conditions include a relatively wide temperature range from approximately −40° C. to 140° C. and the resistance to jarring should be assured up to 80 g.

SUMMARY OF THE INVENTION

It is an object of the present invention to provide an improved position or displacement sensor, especially for accurately determining the position or displacement of a reciprocating mechanical part, such as a valve needle, in a very tight space, which does not have the above-described disadvantages of known optical or magnetic sensors.

This object and others, which will be made more apparent hereinafter, are attained in a microwave sensor for determining the position or displacement of a reciprocating mechanical part, which includes a cavity resonator for microwaves of a predetermined frequency. The cavity resonator comprises at least partly metal walls bounding a cavity dimensioned for the microwaves and into which the reciprocating mechanical part extends, and an antenna for receiving the microwaves input to the cavity.

According to the invention the mechanical part has a metal end, the cavity of the cavity resonator is dimensioned for resonance of an $H_{110}$ mode of the microwaves in the cavity, the cavity is circular-cylindrical, the end of the mechanical part extends into the cavity, the cavity has a diameter between 2.405•c/$\pi$/f and 1.841•c/$\pi$/f, wherein f represents the predetermined frequency of the microwaves fed into the cavity and c represents the speed of light, and the cavity has a height of up to 0.4•2.405•c/$\pi$f, so that it is even possible, for example, to detect a displacement of about 20 microns.

A position or path sensor according to the invention is advantageous because in a simple way, a cavity with small dimensions can be provided, and the mechanical part whose position or path is to be detected protrudes into this cavity, the cavity being designed as a microwave resonator. The sensor of the invention makes use of the propagation conditions, known per se, of electromagnetic waves in the microwave range (approximately 38 GHz) in metal hollow conductors. By reflection and superposition of simple shallow waves, hollow conductor waves are created that can also be understood as interference waves. Because of the geometric conditions in a rectangular hollow conductor, a so-called $H_{10}$ hollow conductor wave forms as the fundamental hollow conductor wave in question, which in the course of propagation of the hollow conductor wave has a defined field line pattern with respect to the electric and magnetic field lines. In a cylindrical hollow conductor, an $H_{11}$ hollow conductor wave correspondingly forms as the fundamental wave; this is the only mode capable of propagation, if the cavity is selected to be sufficiently large.

In the stroke sensor of the invention, a resonator for the hollow conductor waves is formed of the kind described by H.-G. Unger, "Elektromagnetische Theorie für die Hochfrequenztechnik" [Electromagnetic Theory for High-Frequency Technology], Part I, Second Edition, Hütig Verlag, pp. 292–294. Such a resonator is created if in a circular-cylindrical hollow conductor, for instance, both ends are short-circuited with conductive plates. The resultant natural vibrations of the resonator fit precisely into the resonator with an integral multiple of half their propagation wavelength. If a metal needle now protrudes into this cavity resonator, the result is a different field distribution in the cavity resonator, and thus a measurable change in the resonant conditions.

According to the invention, the cavity into which the needle to be detected protrudes is advantageously designed geometrically such that the thus-formed resonator is operated at a specified operating frequency (such as 38 GHz) with a natural vibration in an $H_{110}$ mode. An oscillator for generating the operating frequency, which can also be integrated in combination with a so-called double ratrace ring to replace a conventional insulator and a circulator in the housing of the needle to be detected, is known in a similar form, for instance from EP 0 685 930 A1. The so-called double ratrace ring is an arrangement of two couplers with a mixed diode in a ratrace coupler form.

In a preferred exemplary embodiment, the transmitting output of the oscillator is advantageously coupled into the needle housing, embodied as a cavity resonator, via a wirelike probe acting as a transmitting and receiving antenna or via a rod antenna. Some of the transmission power is supplied, via one arm of the ratrace ring, to a mixer, and the reception signal decoupled from the oscillator is delivered to the second arm of the ratrace ring. Upon mistuning of the cavity resonator by a needle motion, the change in a zero crossover phase can be picked up as a low-frequency signal at one output of the ratrace ring.

The above-described circuit can be constructed in a simple way as a hybrid circuit using so-called microline technology (MIC or monolithic integrated circuit) with an integrated GaAs-MMIC circuit (gallium arsenide microwave monolithic integrated circuit). The dimensioning rules for designing the cavity resonator, using the calculation methods known for instance for cylindrical hollow conductors, result in a maximum diameter $dmax=2.405 \cdot c/\pi/f$ and a minimum diameter $dmin=1.841 \cdot c/\pi/f$, where f is the operating frequency and c is the speed of light. The height of the cylinder should be at maximum $0.4 \cdot dmax$. In a different geometrical design of the cavity resonator, for instance with regular polygons such as a hexagon or octagon and so forth, the dimensioning rules should be adapted accordingly.

In a preferred exemplary embodiment, for an operating frequency of 38 GHz, a resonator diameter of 5.5 mm and a cylinder height of 2 mm result; the reciprocating motions of the needle amount approximately to a range of from 0.2 mm to 1.5 mm into the resonant chamber. The cavity resonator can be disposed symmetrically or asymmetrically with respect to the end of the needle to be detected. Any required fuel (Diesel) recirculation is also possible through the cavity, if the requisite bore for the purpose, in the embodiment described (where f=38 GHz and $\epsilon_R=1$) is selected to be no greater than 2.5 mm, and the cavity size is corrected to suit the dielectric constants.

As an alternative to the above-described inputting of microwave energy into the resonant chamber, the input can also be effected radially or orthogonally via a coupling loop coaxial cable or a hollow conductor. It is also possible to include a ceramic, glasslike or plasticlike carrier material for the antenna (such as $Al_2O_3$, $BaTiO_3$, quartz glass, or plastics such as PE, PC, PP, PTFE, etc.).

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
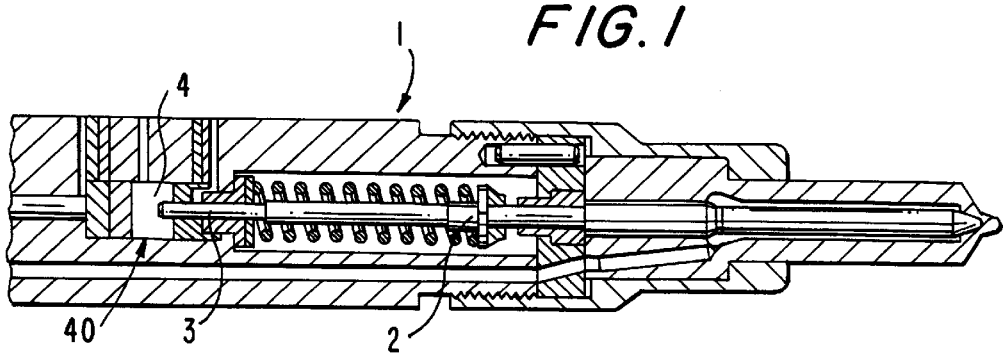
FIG. 1 is a cross-sectional view through an injector nozzle for fuel supply to an internal combustion engine, including a first embodiment of the position or displacement sensor for measuring position or displacement of a valve needle in the injector nozzle.

FIG. 1 shows a section through an injection nozzle 1 for the metered delivery of fuel to an internal combustion engine, such as a Diesel engine. A nozzle needle 2 as a mechanical part, whose function will not be explained in further detail here, executes sometimes relatively short reciprocating motions in its longitudinal axis in order to open or close a valve seat in the injection nozzle 1. One end 3 of the nozzle needle 2 in the exemplary embodiment protrudes into a cavity 4. The cavity, whose walls W, like the needle end 3, are of metal, is selected in its dimensions such that microwave energy input resonates in the cavity. The position or displacement sensor shown in FIG. 1 includes a cavity resonator 40 including the cavity 4 bounded by the metal walls W.

Figure 2:
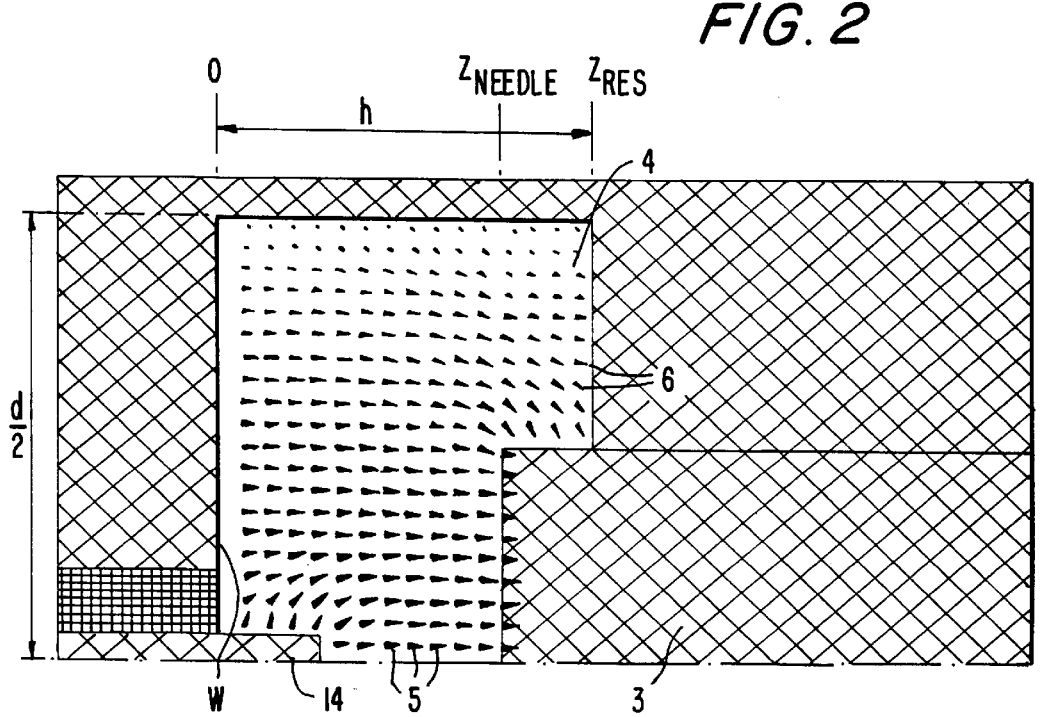
FIG. 2 is a graphical illustration showing field behavior of microwave energy input into a cavity above the valve needle in the microwave position or displacement sensor according to FIG. 1.

A detail view in FIG. 2 shows the cavity resonator 4 with field line courses, represented by arrows 5, which are intended to illustrate the field of a hollow conductor wave in the $H_{110}$ mode input by means of an antenna 14. In this view, the reciprocating motion of the needle end 3 shortens the resonant chamber, whose length is $Z_{res}$ in the region of the needle end 3, to the length $Z_{needle}$ and thus changes the field courses (arrows 6) in this region, causing a change in the resonant frequency.

In the exemplary embodiment shown here, for an operating frequency of 38 GHz, a resonator diameter d of 5.5 mm and a height h of the cylindrical cavity 4 of 2 mm are to be provided, so as to obtain a readily measurable mistuning of the resonant conditions in the cavity resonator 40. The reciprocating motions of the needle end 3 are approximately 0.2 mm to 1.5 mm into the resonant chamber. The dimensions d and h are calculated, for cylindrical cavity resonators, using the equations $dmax=2.405 \cdot c/\pi/f$ and $dmin=1.841\ c/\pi/f$, where f represents the operating frequency and c is the speed of light. The height h of the cylindrical cavity 4 should be at most $0.4 \cdot dmax$.

Figure 3:
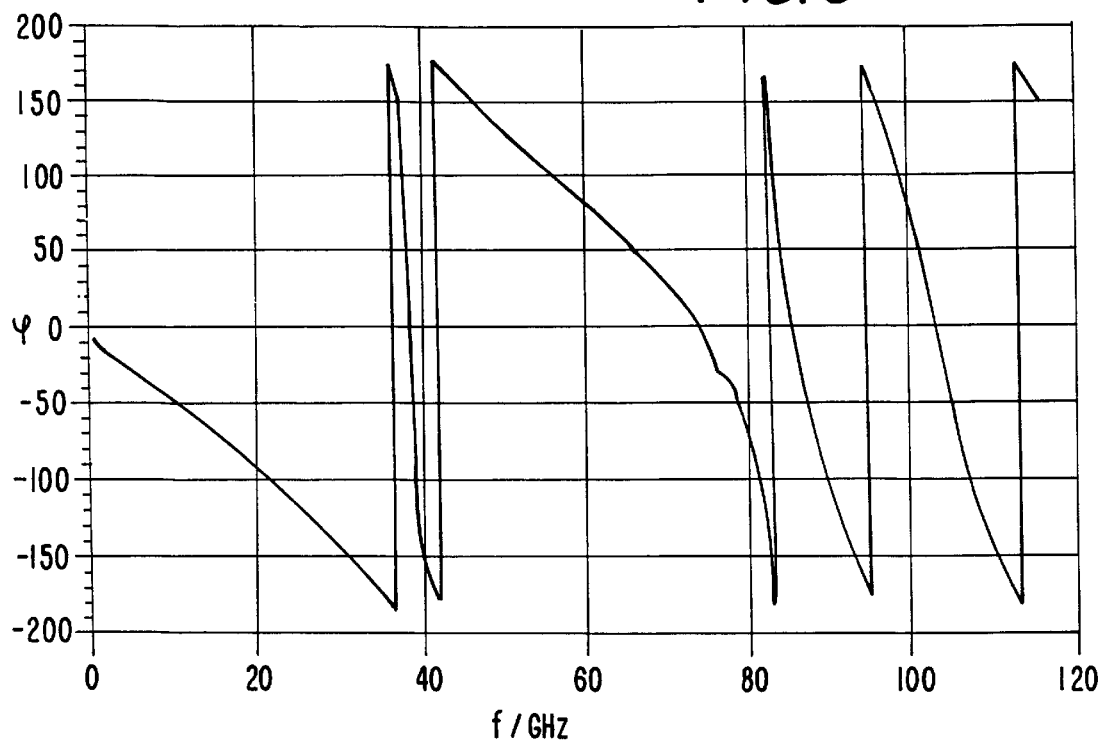
FIG. 3 is a graphical illustration showing the dependence of measured phase of the microwaves on the predetermined frequency of the input microwaves over a microwave frequency range.

A measurable change on the resonant conditions is thus obtained, particularly with the above-described dimensions, for a resonant adaptation of the cavity resonator 40 to an operating frequency of 38 GHz, which can be seen from the graph in FIG. 3. The graph shows that even at a slight mistuning of the resonant chamber 4, a considerable change in the phase φ occurs, which is measurable by means of suitable electronics for example by the evaluating circuit shown in FIGS. 4 and 5.

Figure 4:
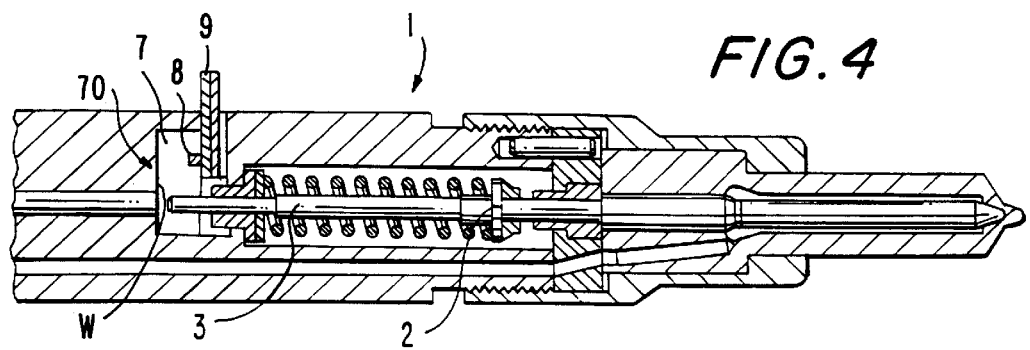
FIG. 4 is a cross-sectional view through an injector nozzle for fuel supply to an internal combustion engine, including a second embodiment of the microwave position or displacement sensor for a valve needle in the injector nozzle.

In a further exemplary embodiment in FIG. 4, a cavity resonator 70 which is asymmetrical with respect to the needle end 3 is provided, and into it the microwave energy is input via a laterally disposed antenna 8. As in the previously described embodiment, the cavity resonator 70 has a cavity 7 bounded by metal walls W into which microwaves of a predetermined or operating frequency are input via the antenna 8. A hybrid circuit 9 in the region of the antenna 8 includes the requisite oscillator circuits and mixing circuits with which an evaluation of the detection signal can be done.

Figure 5:
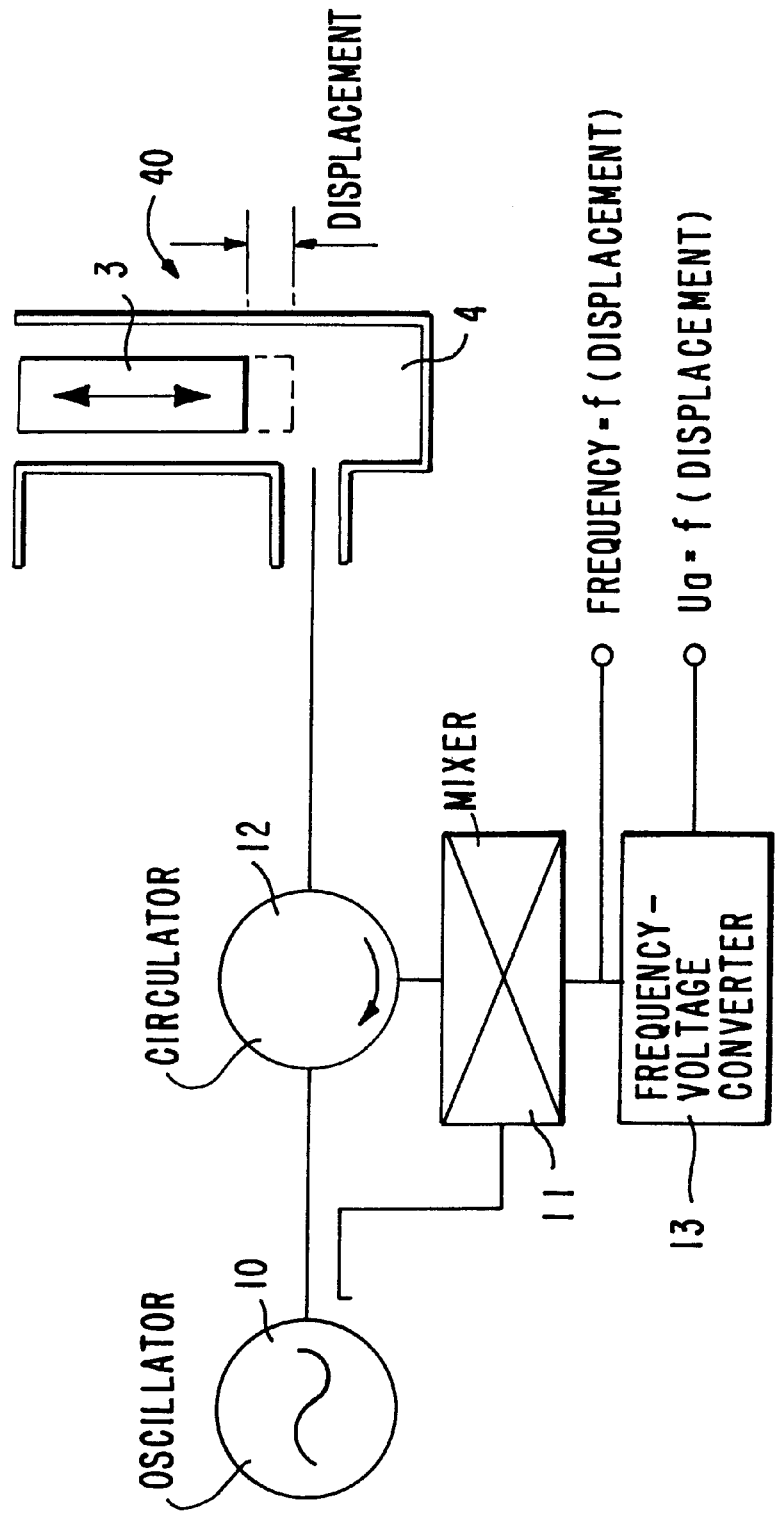
FIG. 5 is a diagram of an evaluation circuit in the position or displacement sensor according to the invention for determining a position or displacement of a movable mechanical part extending into the cavity resonator.

A circuit diagram in FIG. 5 schematically shows the circuit elements with which an evaluation of the detected signal can be performed. With an oscillator 10, a microwave vibration at an operating frequency of 38 GHz is generated. With a mixer 11, the difference between the generated microwave vibration and a microwave vibration that is input into the cavity resonator 4 via a circulator 12 and outcoupled again is found. As the output signal at the mixer 11, either a low-frequency signal whose frequency varies with the reciprocating motion (frequency=f(stroke)), or, via a frequency-voltage converter 13, a signal whose voltage Ua varies with the reciprocating motion (Ua=f(stroke)) is obtained.

What is claimed is:

1. A microwave sensor for determining position or displacement of a movable mechanical part, said microwave sensor including a cavity resonator (40,70) for microwaves of a predetermined frequency, wherein said cavity resonator (40,70) comprises at least partly metal walls bounding a cavity (4,7) into which said mechanical part (2) extends, said cavity (4,7) being dimensioned for resonance of said microwaves at said predetermined frequency, and an antenna (14,8) arranged in the cavity (4,7) for reception of the microwaves in the cavity;

wherein the mechanical part (2) has a metal end (3), the cavity (4,7) of the cavity resonator is dimensioned only for resonance of an $H_{110}$ fundamental wave at said predetermined frequency of said microwaves, the cavity is circular-cylindrical and bounded by the at least partly metal walls, the metal end (3) of the mechanical part extends into the cavity, the cavity has a diameter ($d_{max}$, $d_{min}$) between $2.405 \cdot c/\pi/f$ and $1.841 \cdot c/\pi/f$, wherein f represents the predetermined frequency of the microwaves input to the cavity and c represents the speed of light, and the cavity has a height of up to $0.4 \cdot 2.405 \cdot c/\pi/f$.

2. The microwave sensor as defined in claim 1, wherein the metal end (3) of the mechanical part (2) is arranged symmetrically in the cavity (4).

3. The microwave sensor as defined in claim 1, wherein the metal end (3) of the mechanical part (2) is arranged asymmetrically in the cavity (7).

4. The microwave sensor as defined in claim 1, wherein the mechanical part (2) is a valve needle.

5. The microwave sensor as defined in claim 1, further comprising means for feeding the microwaves into the cavity (4,7) radially or orthogonally and wherein said means for feeding comprises a rod antenna (8,14).

6. The microwave sensor as defined in claim 1, further comprising means for feeding the microwaves into the cavity (4,7) radially or orthogonally and wherein said means for feeding comprises a coupling loop.

7. The microwave sensor as defined in claim 1, further comprising means for feeding the microwaves into the cavity (4,7) radially or orthogonally and wherein said means for feeding comprises a coaxial cable or hollow conductor.

8. The microwave sensor as defined in claim 1, further comprising means for feeding the microwaves into the cavity (4,7) radially or orthogonally and wherein said means for feeding comprises an antenna on a ceramic, glass or plastic carrier material.

9. The microwave sensor as defined in claim 1, further comprising a hybrid circuit (9) of microline (MIC) type including means for generating said microwaves at said predetermined frequency and means for inputting and outcoupling microwaves to and from the cavity (4,7) of the cavity resonator (40,70), and wherein said hybrid circuit is made with or without an integrated GaAs-MMIC circuit.

10. The microwave sensor as defined in claim 9, wherein said hybrid circuit (9) comprises an oscillator (10) for generating said microwaves at said predetermined frequency, a mixer (11) for mixing incoming microwaves to said cavity (7) with out-coupled microwaves from said cavity (7) and for forming a difference oscillation between the incoming microwaves and the out-coupled microwaves, a circulator (12) connecting the mixer (11) and the oscillator (10) with the cavity (7) and a frequency-voltage converter (13) connected with the mixer (11) to generate an electrical signal having a voltage (Ua) varying according to a position or displacement of the end (3) of the mechanical part (2).

11. The microwave sensor as defined in claim 1, wherein the mechanical part (2) is a valve needle of a fuel injector valve in a motor vehicle, and the cavity resonator (40,70) is disposed directly in a housing of the injector valve in the vicinity of an end of the valve needle.

12. The microwave sensor as defined in claim 11, wherein the at least partly metal walls of the cavity are provided with a bore for fuel return.

* * * * *